United States Patent
Wang

Patent Number: 5,417,450
Date of Patent: May 23, 1995

[54] FOLDABLE STROLLER

[75] Inventor: Frank Wang, Tainan, Taiwan, Prov. of China

[73] Assignee: Ho Wei Jovenile Products, Ltd., Tainan Hsien, Taiwan, Prov. of China

[21] Appl. No.: 214,463

[22] Filed: Mar. 18, 1994

[51] Int. Cl.⁶ ............................................. B62B 7/08
[52] U.S. Cl. ................................... 280/642; 280/650
[58] Field of Search ................. 280/638, 639, 38, 641, 280/642, 644, 647, 650, 658; 180/907

[56] References Cited

U.S. PATENT DOCUMENTS

| | | | |
|---|---|---|---|
| 4,733,882 | 3/1988 | Kassai | 280/642 |
| 5,143,398 | 9/1992 | Teng | 280/642 |
| 5,205,579 | 4/1993 | Kato et al. | 280/642 |
| 5,215,320 | 6/1993 | Chen | 280/642 |

*Primary Examiner*—Richard M. Camby
*Attorney, Agent, or Firm*—Beveridge, DeGrandi, Weilacher & Young

[57] ABSTRACT

A foldable stroller includes a seat frame, a pair of wheel frame units disposed on two sides of the seat frame, a backrest frame mounted pivotally to the seat frame, a pair of connecting frames disposed on the two sides of the seat frame, a handle unit and a catch mechanism for retaining releasably the foldable stroller in an unfolded position. Each of the wheel frame units includes a front support member, a rear support member connected pivotally to the seat frame, and a connector for interconnecting pivotally the front and rear support members. Each of the connecting frames includes a pivotable shaft, a pivot pin for connecting pivotally the top end of the pivotable shaft to the seat frame, a rear positioning unit mounted on the pivot pin, a slide piece provided on the bottom end of the pivotable shaft and straddling removably one of the rear support members, a first connecting shaft with two ends connected pivotally and respectively to the pivotable shaft and one of the rear support members, and a second connecting shaft having two ends connected pivotally and respectively to the first connecting shaft and one of the front support members.

4 Claims, 8 Drawing Sheets

FOLDABLE STROLLER

BACKGROUND OF THE INVENTION

1. Field of the Invention

The invention relates to a stroller, more particularly to a foldable stroller with enhanced safety features.

2. Description of the Related Art

Referring to FIG. 1, a conventional foldable stroller 1 is shown to comprise a seat frame 11, a pair of rear support members 12 connected pivotally to two sides of the seat frame 11 by means of pivot pins 111, and a pair of front support members 13 connected to the two sides of the seat frame 11 at front ends of the latter by means of two connecting shafts 112. The top ends of the front and rear support members 13, 12 are connected pivotally to front positioning units 14. The bottom ends of the front and rear support members 13, 12 carry a respective caster 131, 121. The seat frame 11 has two top end portions connected pivotally to two sides of a backrest frame 16. A pair of rear positioning units 113 have bottom ends connected pivotally to a respective connecting unit 15 by means of a linking shaft (not shown). The backrest frame 16 is disposed between inner sides of the connecting units 15. A handle unit 17 is connected to the connecting units 15 at outer sides of the latter. A front guard shaft 18 has two ends connected to the rear positioning units 113.

In order to enhance stability of the foldable stroller 1, a catch mechanism 19 is installed at the connecting units 15, while a blocking plate 10 is installed at each of the rear support members 12. The catch mechanism 19 includes a pair of catch plates 192 biased by a respective tension spring 191 so as to engage normally a corresponding protruding stub 114 on the seat frame 11. The blocking plate 10 is biased by a torsion spring 101 to pivot upwardly relative to the respective rear support member 12.

Referring to FIG. 2, when it is desired to fold the conventional stroller 1, a connecting rod (not shown), which interconnects the catch plates 192, is rotated in order to cause upward pivoting movement of the catch plates 192 so as to disengage the latter from the protruding stubs 114. At this stage, when the handle unit 17 is pushed forward, rearward pivoting movement of the connecting units 15 occurs. Note that further rearward pivoting movement of the connecting units 15 is limited by the blocking plates 10. Thus, in order to fold the conventional stroller 1, it is necessary to press the blocking plates 10 against the action of the torsion springs 101 in order to permit continued rearward pivoting movement of the connecting units 15.

During the folding operation, the backrest frame 16, which is connected to the connecting units 15, eventually reaches a forwardly inclining position. Because of the presence of the connecting shafts 112, the casters 131 on the front support members 13 approach the casters 121 on the rear support members 12, thereby disposing the front and rear support members 13, 12 adjacent to each other while causing the seat frame 11 to lean toward the backrest frame 16. The conventional stroller 1 can thus be folded from the position shown in FIG. 1 to that shown in FIG. 2, and from the position shown in FIG. 2 to that shown in FIG. 3 in order to facilitate storage and transport of the same.

Note that the seat frame 11 leans toward the backrest frame 16 when the conventional stroller 1 is folded. Thus, when the catch mechanism 19 and the blocking plates 10 are released accidentally while the handle unit 17 is pushed forward, untimely folding of the conventional stroller 1 occurs, thereby resulting in injuries to the baby who is seated on the stroller 1.

SUMMARY OF THE INVENTION

Therefore, the objective of the present invention is to provide an improved foldable stroller with enhanced safety features which can overcome the drawback that is associated with the above mentioned prior art.

More specifically, the objective of the present invention is to provide a foldable stroller which has a seat frame that does not lean toward a backrest frame of the same when the foldable stroller is folded, thereby preventing injuries to a baby seated thereon when accidental folding of the foldable stroller occurs.

Accordingly, the foldable stroller of the present invention comprises:

a seat frame including a seat portion and a pair of armrests disposed on two sides of the seat portion, each of the armrests having a front section and a rear section;

a pair of wheel frame units disposed on two sides of the seat frame, each of the wheel frame units including a front support member, a rear support member, and a connector for interconnecting pivotally the front and rear support members, each of the front and rear support members having a bottom end which is provided with a caster, the rear support member further having a top end connected pivotally to the front section of a respective one of the armrests, the rear support member being further provided with an upwardly extending blocking projection;

a backrest frame mounted pivotally on the rear sections of the armrests;

a pair of connecting frames disposed on the two sides of the seat frame, each of the connecting frames including: a pivotable shaft with top and bottom ends; a pivot pin for connecting pivotally the top end of the pivotable shaft to the rear section of a corresponding one of the armrests; a rear positioning unit mounted on the pivot pin; a slide piece provided on the bottom end of the pivotable shaft and straddling removably the rear support member of a corresponding one of the wheel frame units, the slide piece abutting the blocking projection on the rear support member of the corresponding one of the wheel frame units when the foldable stroller is unfolded; a first connecting shaft having two ends connected pivotally and respectively to the pivotable shaft and the rear support member of the corresponding one of the wheel frame units; and a second connecting shaft having two ends connected pivotally and respectively to the first connecting shaft and the front support member of the corresponding one of the wheel frame units;

a handle unit having two lower end portions connected pivotally and respectively to the slide pieces of the connecting frames, the handle unit further having two engaging members which engage respectively the rear positioning units of the connecting frames; and a catch mechanism provided on at least one of the connecting frames and operable so as to maintain releasably a predetermined angle between the pivotable shafts of the connecting frames and the rear support members of the wheel frame units when the foldable stroller is unfolded.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
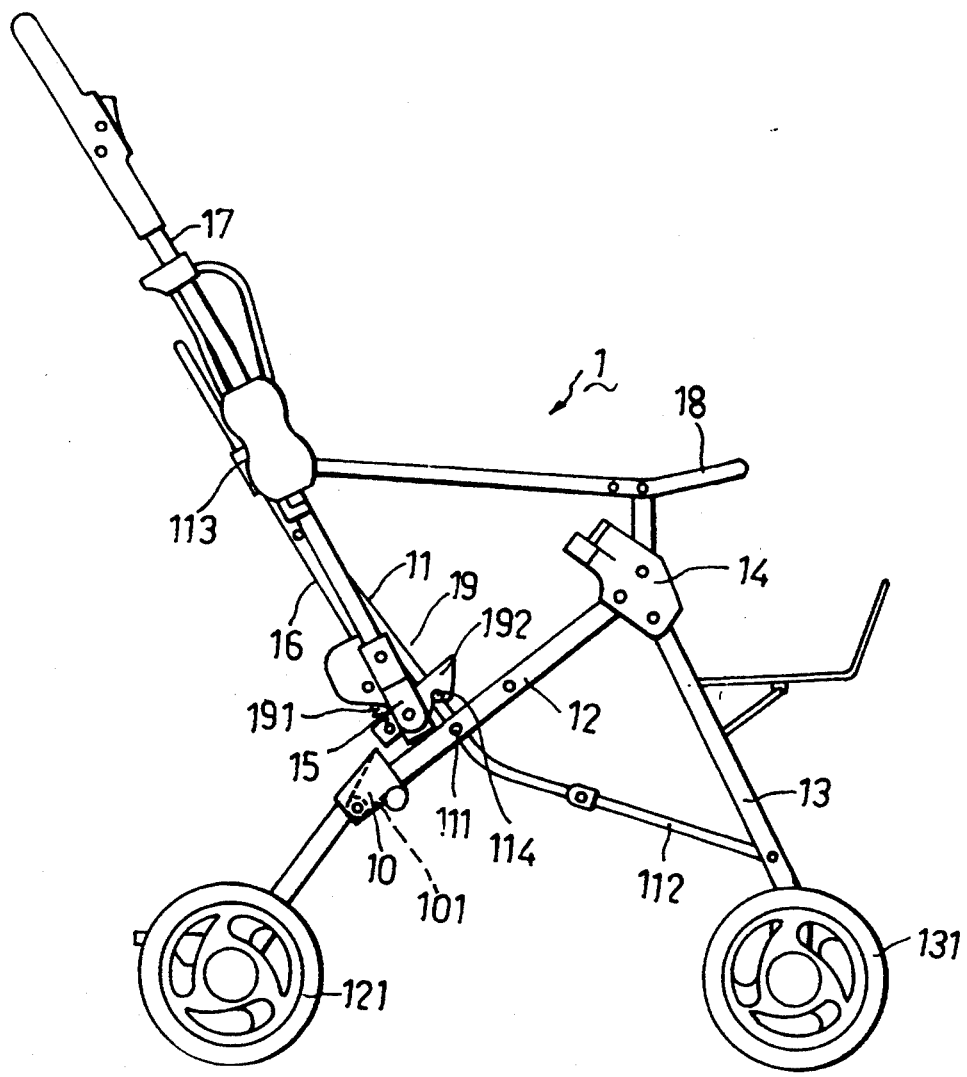
FIG. 1 is a side view of a conventional foldable stroller when in an unfolded position.
Figure 2:
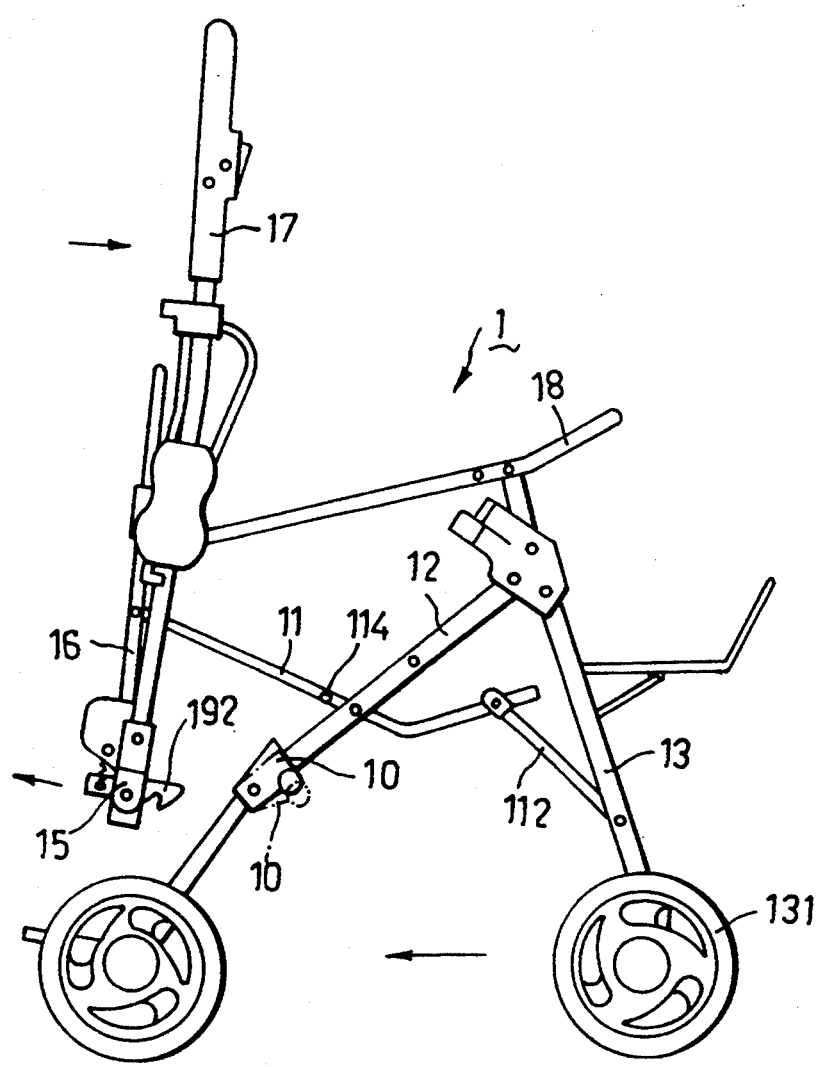
FIG. 2 is a side view of the conventional foldable stroller when in a partly folded position.
Figure 3:
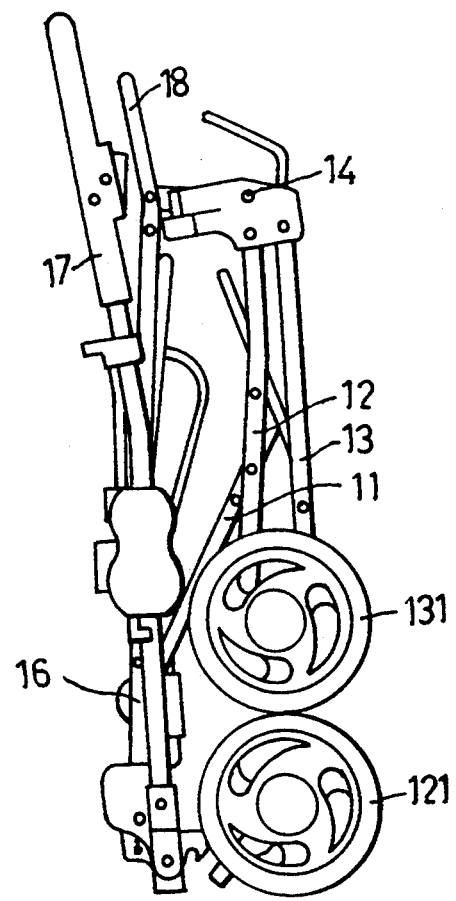
FIG. 3 is a side view of the conventional foldable stroller when in a fully folded position.
Figure 4:
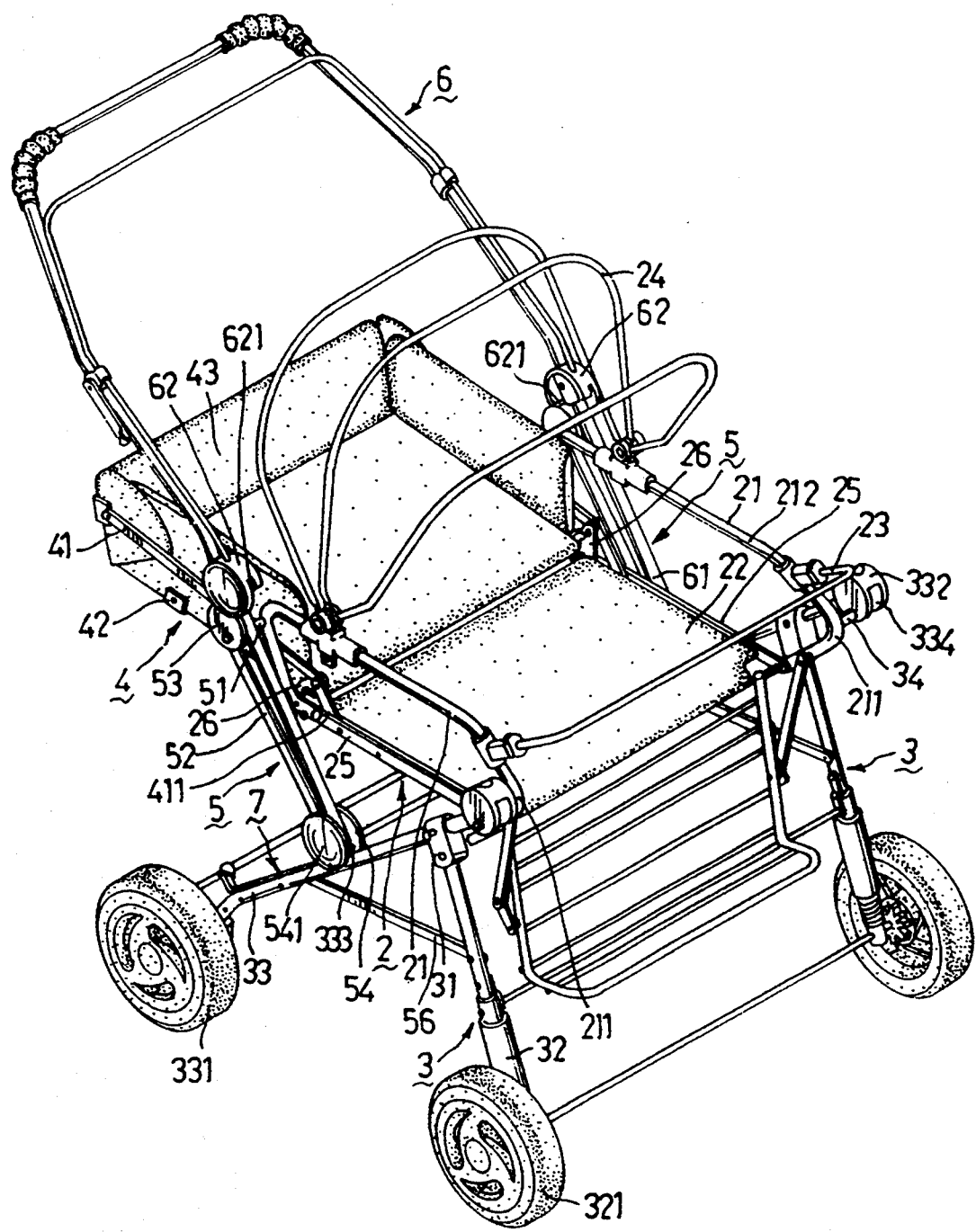
FIG. 4 is a perspective view of the preferred embodiment of a foldable stroller according to the present invention when in an unfolded position.
Figure 5:
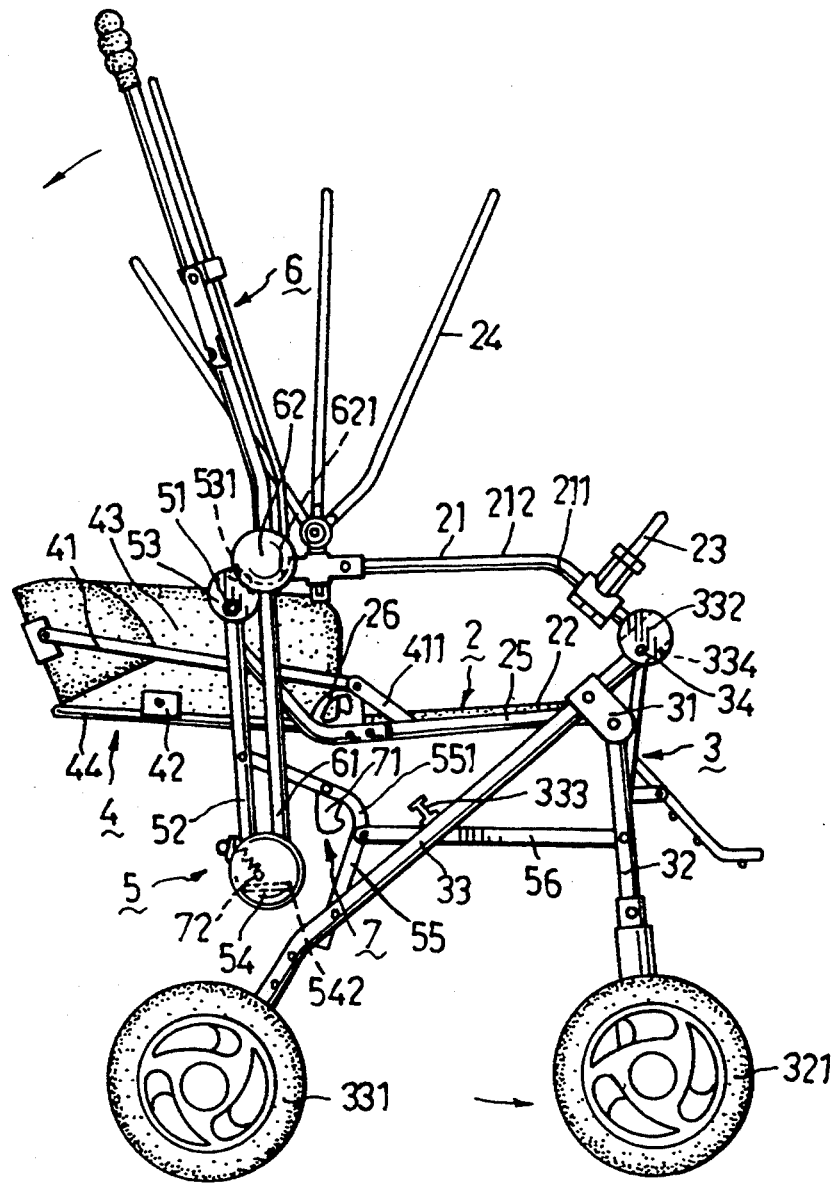
FIG. 5 is a side view which illustrates the preferred embodiment when in a partly folded position.

Referring to FIGS. 4 and 5, the preferred embodiment of a foldable stroller according to the present invention is shown to comprise a seat frame 2, left and right wheel frame units 3, a backrest frame 4, a pair of connecting frames 5, a handle unit 6 and a catch mechanism 7.

The seat frame 2 includes a pair of armrests 21 disposed on two sides of a seat portion 22. A front guard shaft 23 has two ends connected to bent front sections 211 of the armrests 21. The two ends of a hood support frame 24 are connected to parallel straight top sections 212 of the armrests 21. The armrests 21 further have parallel straight bottom sections 25 which are provided with a respective pivot projection 26 adjacent to rear sections of the same.

Each of the wheel frame units 3 is provided on a respective one of the left and right sides of the seat frame 2 and includes a front support member 32, a rear support member 33, and a connector 31 for interconnecting pivotally the front and rear support members 32, 33. The front and rear support members 32, 33 have bottom ends which carry a respective caster 321, 331. A circular front positioning unit 332 is mounted on the top end of the rear support member 33 and has an indented periphery 334. A pivot pin 34 mounts pivotally the front positioning unit 332 on the bent front section 211 of a respective one of the armrests 21. The rear support member 33 is further provided with an upwardly extending blocking projection 333.

The backrest frame 4 is mounted pivotally on the rear side of the seat frame 2 and includes a backrest portion 43 supported by a pair of upper side members 41, a U-shaped support beam 44 and a number of horizontal members 42 (only one is shown) which extend between the upper side members 41 and which are disposed on the support beam 44. Linking plates 411 are employed so as to connect pivotally the front ends of the upper side members 41 and the straight bottom sections 25 of the armrests 21. The front ends of the support beam 44 are connected pivotally and respectively to the pivot projections 26 to permit adjustments in the inclination of the backrest frame 4 relative to the seat frame 2.

The connecting frames 5 are disposed on two sides of the seat frame 2 and are similar in construction. Each of the connecting frames 5 includes a pivotable shaft 52 which has a top end connected pivotally to the rear section of a corresponding one of the armrests 21 by means of a pivot pin 51. A circular rear positioning unit 53 is mounted on the pivot pin 51. The rear positioning unit 53 has a recessed peripheral section 531. The pivotable shaft 52 has a bottom end which is provided with a slide piece 54 that straddles releasably the rear support member 33 of a corresponding one of the wheel frame units 3. The slide piece 54 includes a pair of opposed plates 541 and a positioning plate 542 which extends between the opposed plates 541. A bent first connecting shaft 55 has two ends connected pivotally and respectively to the pivotable shaft 52 and the rear support member 33. Each of the connecting frames 5 further includes a second connecting shaft 56 which has two ends connected pivotally and respectively to a bent intermediate section 551 of the first connecting shaft 55 and the front support member 32 of the corresponding one of the wheel frame units 3. Relative movement among the pivotable shaft 52 and the first and second connecting shafts 55, 56 can result in folding of the foldable stroller of the present invention.

The handle unit 6 is generally inverted U-shaped and is connected pivotally to the connecting frames 5. The handle unit 6 has two lower end portions 61 connected pivotally and respectively to the slide pieces 54 of the connecting frames 5. The handle unit 6 is provided with two circular engaging members 62 which correspond with the rear positioning units 53. Each of the engaging members 62 has a peripheral portion 621 which engages pivotally and removably the recessed peripheral section 531 of the corresponding rear positioning unit 53. Normally, the handle unit 6 extends adjacent to the pivotable shafts 52 of the connecting frames 5 to permit pushing of the foldable stroller from behind. The handle unit 6, however, can be pivoted so that the peripheral portions 621 of the engaging members 62 engage pivotally and removably the indented periphery 334 of a corresponding one of the front positioning units 332 so as to permit forward pushing of the foldable stroller.

Figure 6:
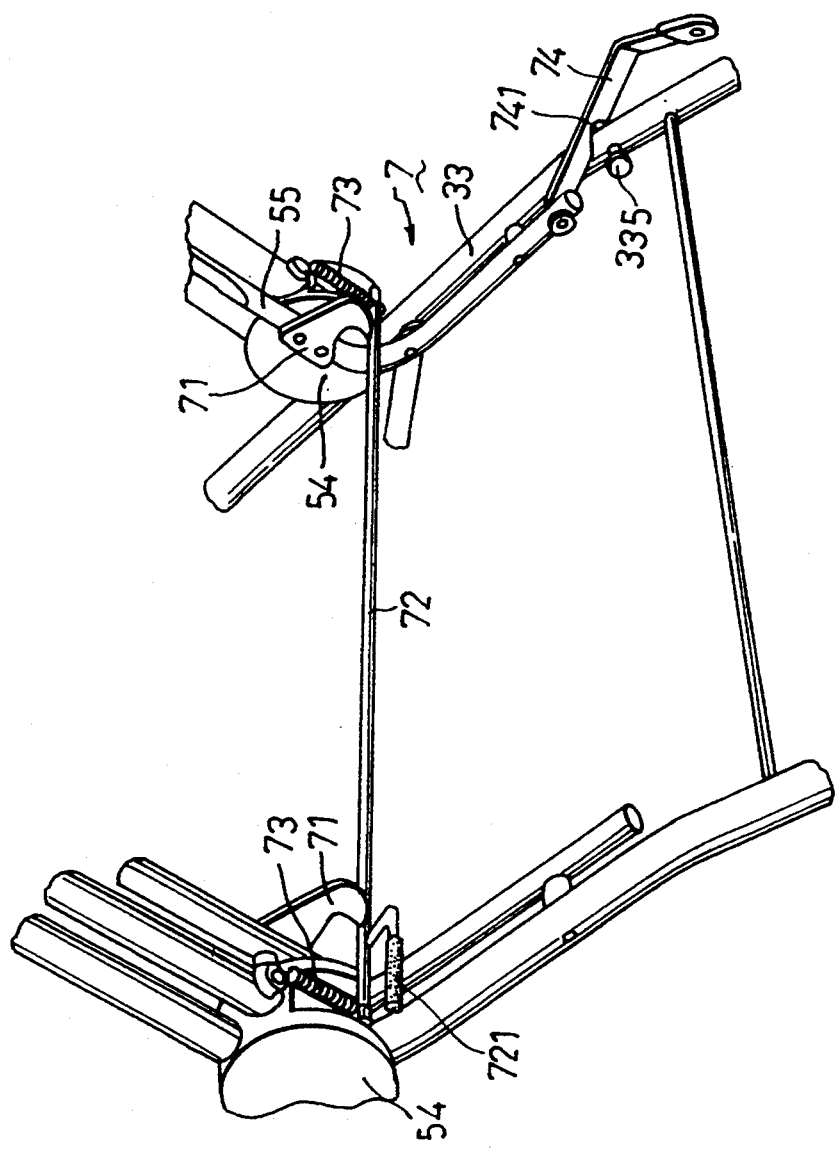
FIG. 6 is a perspective view of a catch mechanism of the preferred embodiment.

Referring to FIGS. 5 and 6, the catch mechanism 7 includes two catch plates 71 mounted respectively on the first connecting shafts 55 of the connecting frames 5. A horizontal rod 72 extends between the slide pieces 54 of the connecting frames 5. Each of the connecting frames 5 is provided with a tension spring 73 which pulls one of two ends of the horizontal rod 72 to engage releasably a corresponding one of the catch plates 71. To facilitate operation of the catch mechanism 7, the horizontal rod 72 is provided with a lever 721. In order to minimize further the risk of untimely folding of the foldable stroller, a fastening plate 74 is mounted pivotally on one end of the first connecting shaft 55 of one of the connecting frames 5. The fastening plate 74 is formed with a positioning notch 741 which engages releasably a fastening projection 335 formed on the rear support member 33 of one of the wheel frame units 3. The purpose of the catch mechanism 7 is to maintain releasably a predetermined angle between the pivotable shafts 52 of the connecting frames 5 and the rear support members 33 of the wheel frame units 3 when the foldable stroller is unfolded. When the foldable stroller is in an unfolded position, the positioning plates 542 of the slide pieces 54 abut the blocking projections 333 on the rear support members 33 to limit forward sliding movement of the slide pieces 54 on the rear support members 33.

Figure 7:
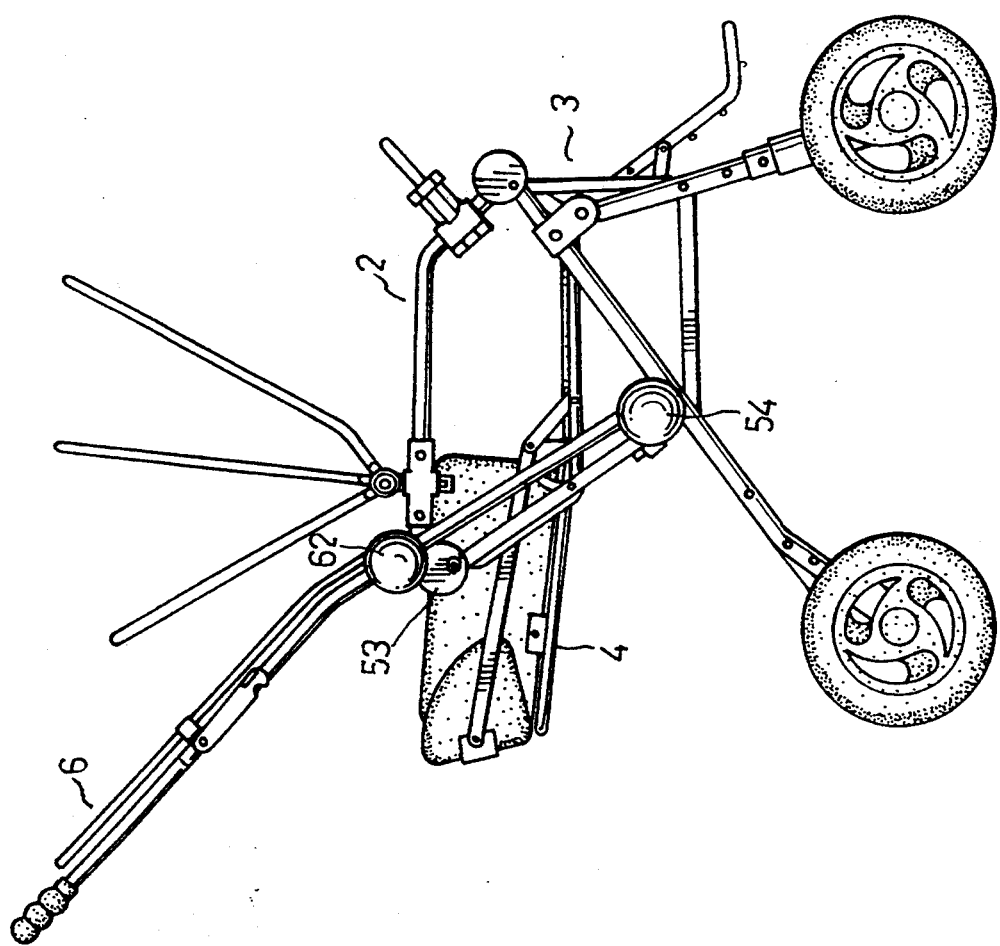
FIG. 7 is a side view which illustrates the preferred embodiment when in the unfolded position.

When it is desired to unfold the foldable stroller of the present invention, the handle unit 6 is pulled rearward so as to cause forward pivoting movement of the slide pieces 54 and enable the latter to straddle on the rear support members 33. When the positioning plates 542 of the slide pieces 54 abut the blocking projections 333 on the rear support members 33, the horizontal rod 72 between the slide pieces 54 engages the catch plates 71 on the first connecting shafts 55, thereby retaining the foldable stroller in the unfolded position, as shown in FIG. 7.

When it is desired to fold the foldable stroller of the present invention, pressure is applied on the lever 721 of the horizontal rod 72 to disengage the horizontal rod 72 from the catch plates 71. The fastening plate 74 is also pivoted so as to disengage the latter from the rear support member 33 of one of the wheel frame units 3. The handle unit 6 is then pushed forward so that the pivotable shafts 52 and the slide pieces 54 of the connecting frames 5 pivot rearward. When the pivotable shafts 52 pivot rearward, a forward pushing force is applied on the armrests 21 of the seat frame 2. The first connecting shafts 55, which have one end connected to the pivotable shafts 52, begin to pivot, thereby pulling the second connecting shafts 56 rearward to cause rearward movement of the front support members 32 and forward and downward movement of the seat frame 2. The foldable stroller is thus folded from the position shown in FIG. 7 to that shown in FIG. 5, and from the position shown in FIG. 5 to that shown in FIG. 8 in order to facilitate storage and transport of the same.

Figure 8:
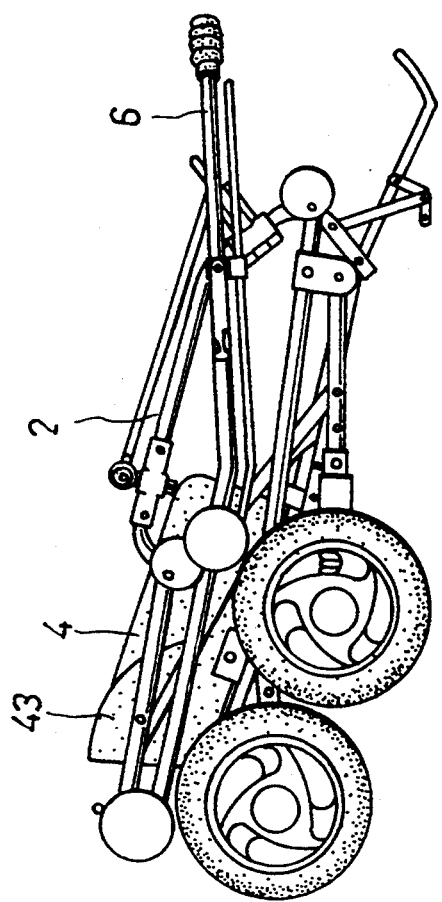
FIG. 8 is a side view which illustrates the preferred embodiment when in a fully folded position.

Referring to FIG. 8, the seat portion 22 and the backrest portion 43 move forwardly and downwardly when the foldable stroller of the present invention is folded to the fully folded position. The seat portion 22 does not lean toward the backrest portion 43, unlike the conventional stroller described beforehand. Therefore, even if the catch mechanism 7 was released accidentally, injuries to the baby seated on the foldable stroller of the present invention can be prevented since the baby will not be trapped between the seat frame 2 and the backrest frame 4. The safety features of the foldable stroller are thus enhanced, thereby meeting the objective of the present invention.

It is noted that numerous modifications in the construction of the catch mechanism 7 can be made while ensuring that the foldable stroller of the present invention is still capable of meeting its objective. Any catch mechanism that is capable of retaining releasably the foldable stroller in the unfolded position can be employed in the present invention. Thus, the configuration of the catch mechanism should not be limited to that of the disclosed embodiment. It is also noted that the particular connection for connecting pivotally the backrest frame 4 to the seat frame 2 is not essential to the present invention since such a connection only permits multiple-stage adjustments in the inclination of the backrest frame 4 relative to the seat frame 2. In addition, the front and rear positioning units 332, 53 only serve to retain the handle unit 6 selectively in one of two positions in order to permit pushing of the foldable stroller from the front or from behind and does not affect the folding action of the foldable stroller. Thus, the structural connection among the front and rear positioning units 332, 53 and the handle unit 6 should not be limited to that of the disclosed embodiment.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A foldable stroller, comprising:
    a seat frame including a seat portion and a pair of armrests disposed on two sides of said seat portion, each of said armrests having a front section and a rear section;
    a pair of wheel frame units disposed on two sides of said seat frame, each of said wheel frame units including a front support member, a rear support member, and a connector for interconnecting pivotally said front and rear support members, each of said front and rear support members having a bottom end which is provided with a caster, said rear support member further having a top end connected pivotally to said front section of a respective one of said armrests, said rear support member being further provided with an upwardly extending blocking projection;
    a backrest frame mounted pivotally on said rear sections of said armrests;
    a pair of connecting frames disposed on said two sides of said seat frame, each of said connecting frames including: a pivotable shaft with top and bottom ends; a pivot pin for connecting pivotally said top end of said pivotable shaft to said rear section of a corresponding one of said armrests; a rear positioning unit mounted on said pivot pin; a slide piece provided on said bottom end of said pivotable shaft and straddling removably said rear support member of a corresponding one of said wheel frame units, said slide piece abutting said blocking projection on said rear support member of the corresponding one of said wheel frame units when said foldable stroller is unfolded; a first connecting shaft having two ends connected pivotally and respectively to said pivotable shaft and said rear support member of the corresponding one of said wheel frame units; and a second connecting shaft having two ends connected pivotally and respectively to said first connecting shaft and said front support member of the corresponding one of said wheel frame units;
    a handle unit having two lower end portions connected pivotally and respectively to said slide pieces of said connecting frames, said handle unit further having two engaging members which engage respectively said rear positioning units of said connecting frames; and
    a catch mechanism provided on at least one of said connecting frames and operable so as to maintain releasably a predetermined angle between said pivotable shafts of said connecting frames and said rear support members of said wheel frame units when said foldable stroller is unfolded.

2. The foldable stroller as claimed in claim 1, wherein said rear positioning unit of each of said connecting frames has a recessed peripheral section, each of said engaging members having a peripheral portion which engages pivotally and removably said recessed peripheral section of said rear positioning unit of a corresponding one of said connecting frames to permit pushing of said foldable stroller from behind, said top end of said rear support member of each of said wheel frame units having a front positioning unit mounted thereon, said front positioning unit being connected pivotally to said front section of the respective one of said armrests and having an indented periphery, said peripheral portion of each of said engaging members engaging pivotally and removably said indented periphery of said front positioning unit of a corresponding one of said wheel frame units to permit forward pushing of said foldable stroller.

3. The foldable stroller as claimed in claim 1, wherein said catch mechanism comprises:

two catch plates mounted respectively on said first connecting shafts of said connecting frames;

a horizontal rod extending between said slide pieces of said connecting frames; and two tension springs, each of which being provided on a respective one of said connecting frames, for pulling two ends of said horizontal rod to engage releasably said catch plates.

4. The foldable stroller as claimed in claim 1, wherein said catch mechanism comprises:

a fastening projection formed on said rear support member of one of said wheel frame units; and a fastening plate mounted pivotally on one end of said first connecting shaft of one of said connecting frames, said fastening plate being formed with a positioning notch to engage releasably said fastening projection.

* * * * *